(12) United States Patent
Morgan

(10) Patent No.: US 12,228,522 B1
(45) Date of Patent: *Feb. 18, 2025

(54) SURFACE ASSET MANAGEMENT MAPPING SYSTEM

(71) Applicant: Mike Morgan, Fayetteville, AR (US)

(72) Inventor: Mike Morgan, Fayetteville, AR (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/723,827

(22) Filed: Apr. 19, 2022

Related U.S. Application Data

(63) Continuation-in-part of application No. 16/704,834, filed on Dec. 5, 2019, now Pat. No. 11,335,381, which is a continuation-in-part of application No. 15/636,901, filed on Jun. 29, 2017, now Pat. No. 10,533,864.

(60) Provisional application No. 62/356,202, filed on Jun. 29, 2016.

(51) Int. Cl.
*G01N 21/88* (2006.01)
*G06F 3/02* (2006.01)
*G06F 3/0482* (2013.01)

(52) U.S. Cl.
CPC ......... *G01N 21/8803* (2013.01); *G06F 3/02* (2013.01); *G06F 3/0482* (2013.01); *G01N 2021/8864* (2013.01); *G01N 2223/614* (2013.01)

(58) Field of Classification Search
CPC ....... G01N 21/8803; G01N 2021/8864; G01N 2223/614; G06F 3/02; G06F 3/0482
See application file for complete search history.

(56) References Cited

U.S. PATENT DOCUMENTS

| | | | |
|---|---|---|---|
| 4,052,712 A | 10/1977 | Ohama et al. | 346/107 |
| 4,781,465 A | 11/1988 | Demachi et al. | 356/371 |
| 4,796,998 A | 1/1989 | Soma et al. | 356/376 |
| 5,253,940 A | 10/1993 | Abecassis | 400/495 |
| 6,741,790 B1 * | 5/2004 | Burgess | H04N 5/9201 |
| 9,171,363 B2 | 10/2015 | Suzuki et al. | |
| 10,533,864 B1 | 1/2020 | Morgan | |
| 11,335,381 B1 | 5/2022 | Morgan | |
| 2002/0176608 A1 | 11/2002 | Rose | 382/108 |
| 2012/0203428 A1 | 8/2012 | Choi et al. | 701/37 |
| 2013/0007501 A1 * | 1/2013 | Areal | G06Q 10/20 714/2 |
| 2013/0155061 A1 | 6/2013 | Jahanshahi et al. | 345/419 |
| 2014/0160295 A1 | 6/2014 | Kyomitsu et al. | 348/159 |

(Continued)

FOREIGN PATENT DOCUMENTS

WO  WO-02101328  12/2002

OTHER PUBLICATIONS

JP H0711750 B2 with English translation. Date filed May 24, 1985. Date published Feb. 8, 1995. (Year: 1995).*

*Primary Examiner* — Calvin Cheung
(74) *Attorney, Agent, or Firm* — Keisling & Pieper PLC; David B. Pieper; Trent C. Keisling

(57) ABSTRACT

An asset management mapping system including a microphone recording the audio of the asset inspector and a condition signal generator generating an audio condition signal based on asset inspector input from a keypad including condition selectors recorded into a global positioning system audio and video recorder that associates the audio and video with a gps location to create a pavement condition database. The database is interpreted to generate a condition output map of the areas inspected.

3 Claims, 4 Drawing Sheets

(56) References Cited

U.S. PATENT DOCUMENTS

| | | | |
|---|---|---|---|
| 2014/0355839 A1* | 12/2014 | Bridgers | B60W 40/06 |
| | | | 382/108 |
| 2015/0330911 A1 | 11/2015 | Howard | |
| 2015/0356867 A1 | 12/2015 | Bogren et al. | |
| 2016/0048810 A1 | 2/2016 | Shimada et al. | |
| 2016/0292518 A1 | 10/2016 | Banitt et al. | |
| 2016/0292750 A1 | 10/2016 | Ritter | |
| 2016/0356001 A1 | 12/2016 | Shimada et al. | |
| 2017/0010122 A1 | 1/2017 | Abe | |

* cited by examiner

| 230 GOOD | 232 FAIR | 234 CRITICAL | 236 LOST |
|---|---|---|---|
| 238 EXCELLENT | 240 SURFACE | 242 # | 250 STAR2 |
| 260 VOICE | 272 MASS CRACK | 270 ### | 252 STAR1 |

| 231 | 233 | 235 | 237 |
|---|---|---|---|
| 239 | 241 | 243 | 251 |
| 261 | 273 | 271 | 253 |

SURFACE ASSET MANAGEMENT MAPPING SYSTEM

CROSS-REFERENCE TO RELATED APPLICATIONS

This application claims priority to U.S. application Ser. No. 16/704,834 filed on Dec. 5, 2019 entitled Surface Asset Management Mapping System which claims priority to U.S. application Ser. No. 15/636,901 filed on Jun. 29, 2017 entitled Asset Management Mapping System which is a continuation in part of U.S. provisional application 62/356,202 filed on Jun. 29, 2016 entitled Asset Management Mapping System which are both hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in condition management for maintaining large area assets such as pathways, parking lots, driveways, roads, and highways. More particularly, the invention relates to improvements particularly suited for monitoring the condition of pathways constructed from asphalt, pavement, chip seal, or the like. In particular, the present invention relates specifically to a global positioning recording system combined with a pavement condition capturing system to generate a condition map showing various pavement conditions and problems.

2. Description of the Known Art

As will be appreciated by those skilled in the art, pavement condition video reviewing systems are known in various forms. Patents disclosing information relevant to pavement appearance include: U.S. Pat. No. 6,741,790, issued to Burgess on May 25, 2004. This patent is hereby expressly incorporated by reference in its entirety.

The abstract of U.S. Pat. No. 6,741,790 states: The system of the present invention includes a hardware device (40) and software, which are configurable and operable in three modes: recording mode, indexing mode, and playback mode. In the recording mode, the hardware device (40) is connected to a GPS receiver (44) and video recording device (42), and permits GPS data to be recorded on the same recording medium that images are recorded on using the video recording device (42). As a result, a particular geographic location associated with particular images can be directly referenced by GPS data. After recording the images, the hardware device (40) is connected to a computer (46) having the software of the present invention installed, and the system causes GPS data to be transferred from the recording medium to the computer (46) as the recorded images are replayed. During this step, called the indexing mode, the computer (46) draws a map showing all of the GPS referenced locations recorded on the recording medium. Each map location represents a location where images were recorded with GPS data. Once the indexing mode is completed, the system can be used to play back the images recorded, in accordance with the selection of a location on a map. During this step, called the playback mode, a marker may be selected on the computer (46) generated indexed map, and the system will cause the video recording device (42) to play back the images that were recorded at that selected location. Alternatively, if the recorded images have been transferred to some other media, for example CD ROM or hard disk, the system will cause the computer (46) to play back the images that were recorded at that selected location.

From these prior references it may be seen that these prior art patents are very limited in their teaching and utilization, and an improved asset management mapping system is needed to overcome these limitations.

SUMMARY OF THE INVENTION

The present invention is directed to an improved asset management mapping system using a condition signal generator with multiple condition gauging conditions and a coordinated output system for generating management maps. In accordance with one exemplary embodiment of the present invention, an asset management mapping system is provided including a microphone recording the audio of the asset inspector and a condition signal generator generating an audio condition signal based on the asset inspector's input from a keypad. The keypad includes condition selectors electrically coupled to a sound generator that generate unique sounds that can be recorded alongside the audio of the asset inspector via the global positioning system audio and video recorder that associates the audio and video with a gps location to create a pavement condition database. When the recorded database is then converted to a map, the condition data is either laid on top of the map data or used to change the map data to generate unique indicators such as colors or unique patterns on the map that can be read as a condition output map of the areas inspected.

One object of the present invention is to provide an efficient quick inspection process to reviewing large areas of pavement to maintain accurate knowledge about pavement inventory and present this information in a visual format for management of the pavement inventory.

Another object is to provide a coded map output so that large areas of pavement can be quickly reviewed to prioritize repairs and maintenance.

A still further object of the present invention is to provide a simple system that is easily used to generate the database and output maps.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figures 1, 2, 2A:
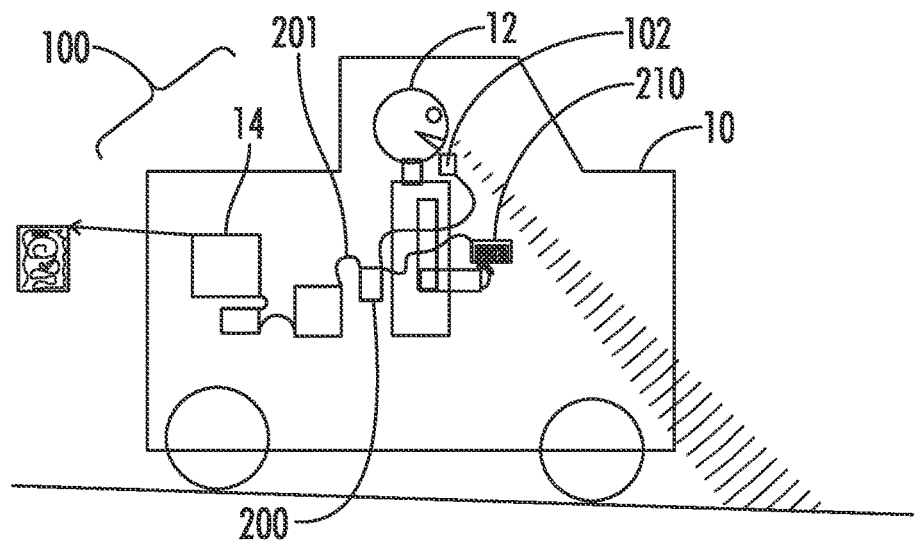
FIG. 1 is a perspective view of an asset inspector visually scanning the pavement and selecting a condition being recorded and output to a pavement condition map.
FIG. 2 is an enlarged view of the condition selections on the keypad.
FIG. 2a is a schematic view showing examples of unique six bit signals for audio recording.

As shown in FIG. 1 of the drawings, one exemplary embodiment of the present invention is generally shown as an asset management mapping system 100 mounted in a vehicle 10 operated by an asset inspector 12. The asset inspector 12 monitors the road conditions and a video camera records the position and view of the camera on a global positioning system (gps) audio and video recorder 14 that associates the audio and video with a gps location. Connected into the audio recording section of the video recorder 14 is an asset management mapping system 100 including a microphone 102 recording the audio of the asset inspector and a condition signal generator 200 generating an audio condition signal 201 based on asset inspector input from a keypad 210 including condition selectors 220. This information is recorded onto the audio track of the gps video recorder 14.

The keypad includes multiple condition selectors 220. In the preferred embodiment shown, the condition selectors 220 include: Good condition selector 230; Fair condition selector 232; Critical condition selector 234; Lost condition selector 236; Excellent condition selector 238; Surface condition selector 240; Cracked Surface Condition selector 242; Starting pothole condition selector 250; Critical pothole condition selector 252; Audio note condition selector 260; Large volume cracking condition selector 270; and Alligator surface condition selector 272. Other signal conditions could include ones for monitoring signs, landscaping, striping, reflectors, or other assets near or associated with the pavement or asset being monitored.

In the condition signal generator 200, each condition selector 230 has an individually identifiable audio condition signal 201 shown as a six bit signal having unique signals such as Good condition signal 231; Fair condition signal 233; Critical condition signal 235; Lost condition signal 237; Excellent condition signal 239; Surface condition signal 241; Cracked Surface Condition signal 243; Starting pothole condition signal 251; Critical pothole condition signal 253; Audio note condition signal 261; Large volume cracking condition signal 271; and Alligator surface condition signal 273. Once a selector 220 is chosen the condition signal generator 200 will either act as a short term pulse to note a specific spot such as a pot hole and then return to the previous long term signal, or will change the long term signal such as an extended alligator pattern and to continue to generate that audio condition signal 201 until a new condition selector 220 is chosen or the recording is terminated. This information is recorded on the audio track of the gps video recorder 14.

Figure 4:
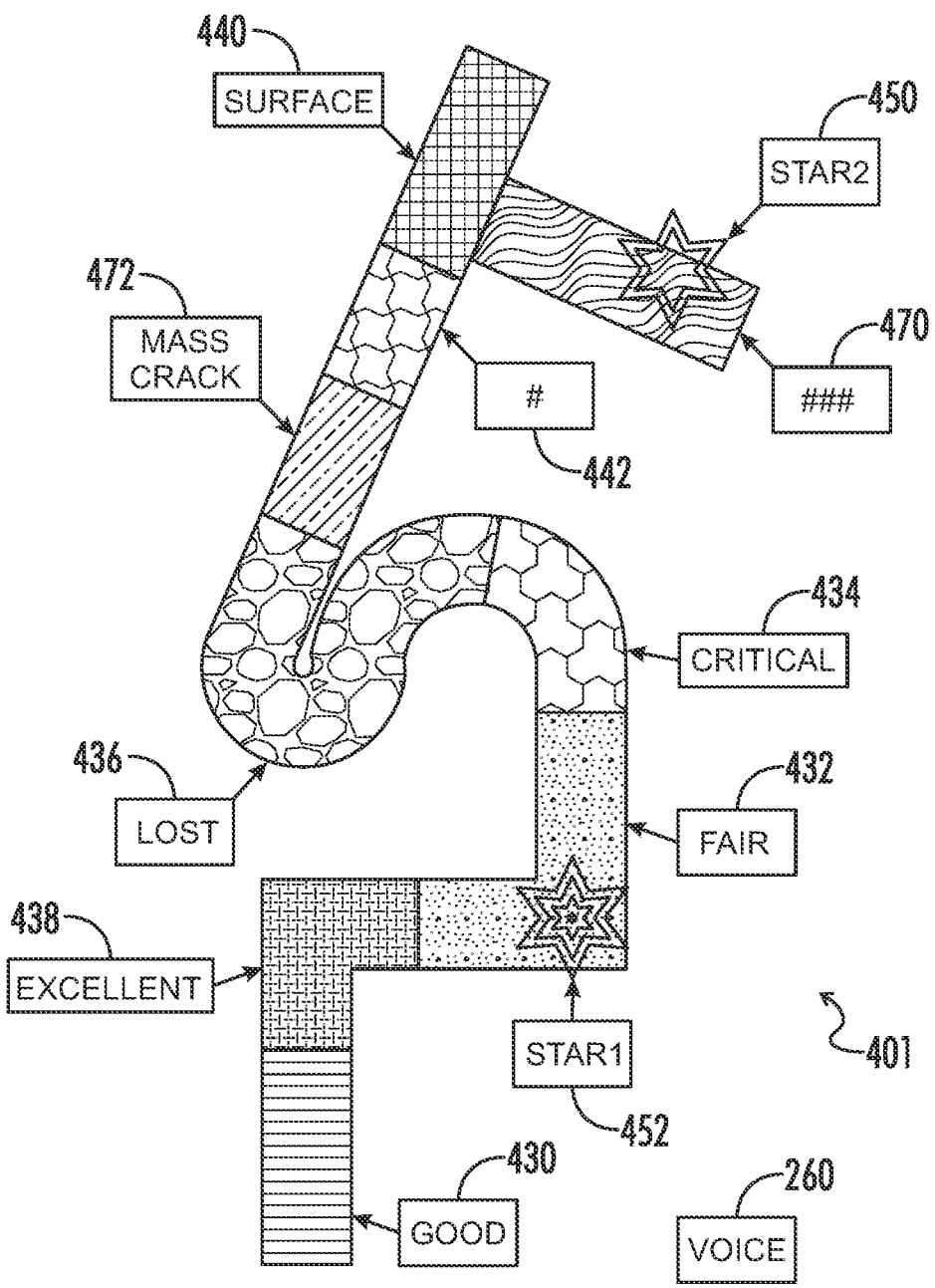
FIG. 4 is an enlarged view of an output map showing multiple different zones indicated by a cross hatching pattern and stars.
Figure 5:
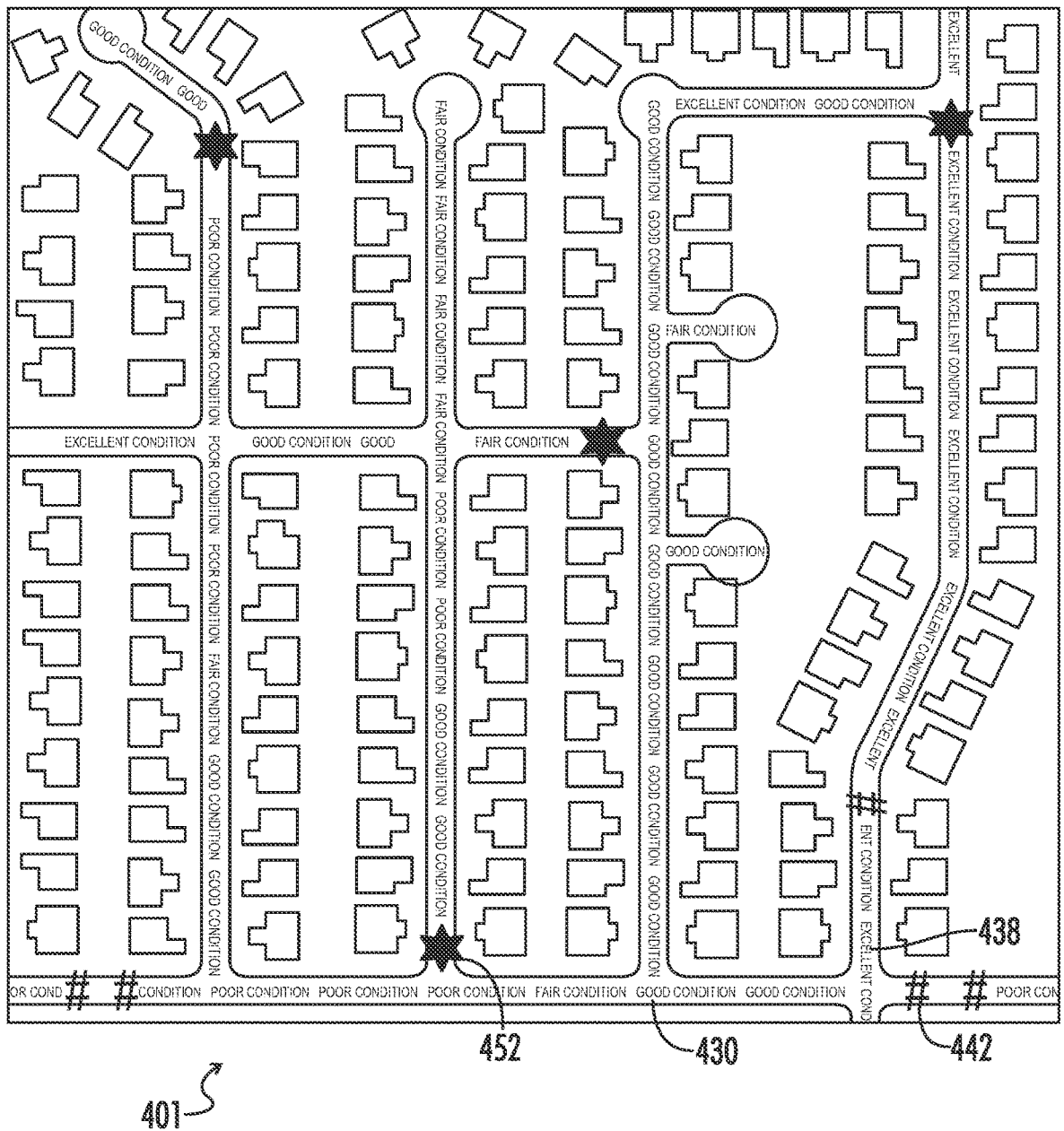
FIG. 5 is an enlarged view of an output map showing multiple different zones indicated by a wording aligned with the street areas and a number sign type cross hatching pattern and stars used as other indicators.

During decoding of the recorded data from the gps video recorder 14, a condition tone decoder 300, such as an analog to digital decoder or pulse width monitoring system reads the condition signal 201 associated with a gps location and assigns a unique condition indicator 402 for each one of the condition selector 220 originally selected by the operator. In this manner, the user's observations are recorded to be associated with a gps location and then decoded for later use in a database or map. FIG. 4 shows the associated map output for showing the varying condition indicator 402 output in a cross hatching example. Th condition indicators 402 include a Good condition pattern 430; Fair condition pattern 432; Critical condition pattern 434; Lost condition pattern 436; Excellent condition pattern 438; Surface condition pattern 440; Cracked Surface Condition pattern 442; Starting pothole condition pattern 450; Critical pothole condition pattern 452; Audio note condition pattern 260; Large volume cracking condition pattern 470; and Alligator surface condition pattern 472. Examples of the unique output include shading variations, different colors, different patterns, or perceivable variations. FIG. 4 shows how different shadings can be used to indicate the various condition selectors and FIG. 5 shows how the condition indicators 402 can be wording to indicate the various conditions. Preferably, the unique output is as simple as unique color such as a red output for the critical condition selector and a green output for a good condition selector. Using colors, a simple condition output device 400 such as a color printer can then output a color map showing the various conditions over a large area where the areas can be identified easily.

Figure 3:
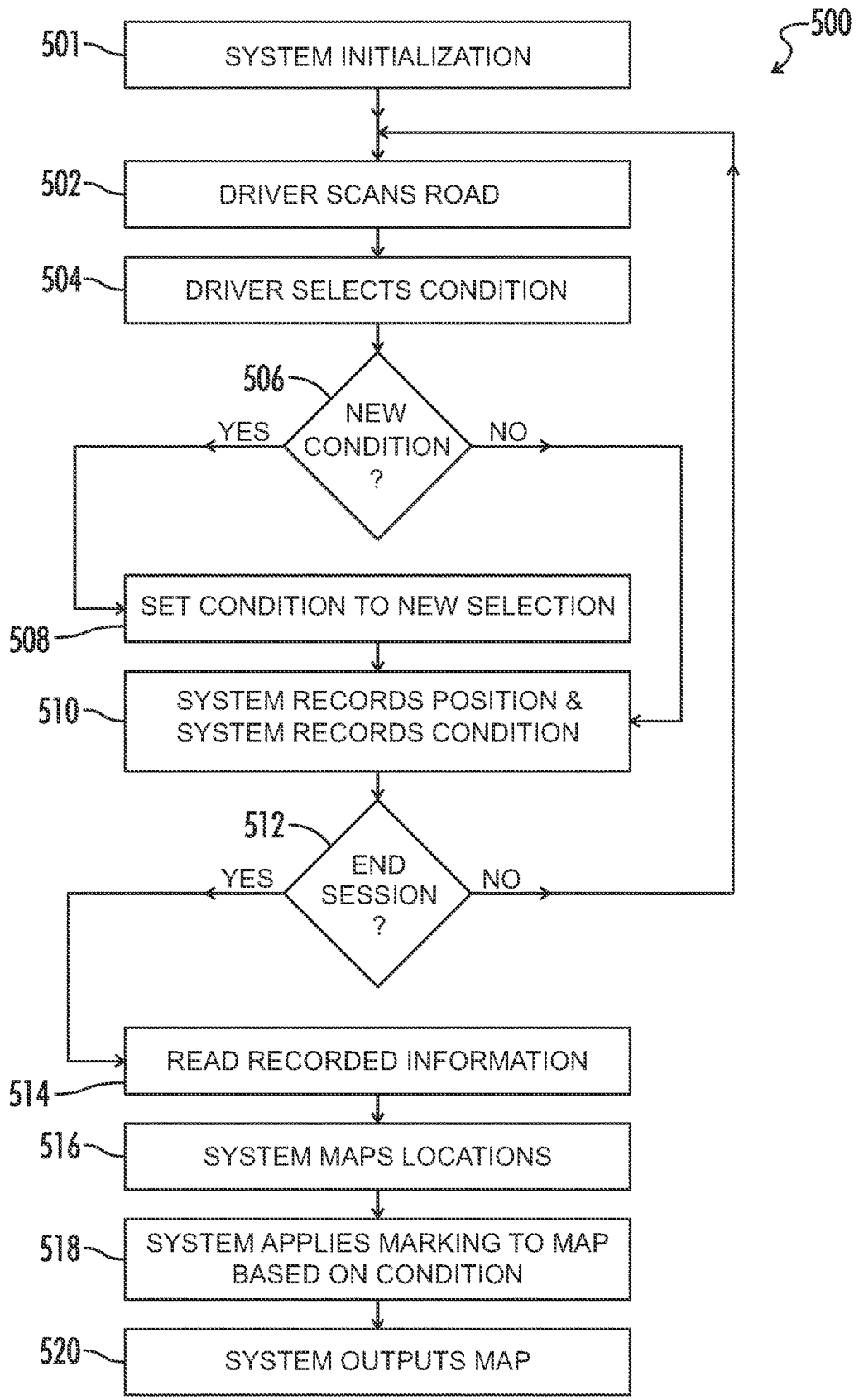
FIG. 3 is a schematic flow chart of the scan to the map output.

FIG. 3 provides a flow overview of the system operation 500. Upon initiation, the system records its position and sets a base tone signal 501. The asset inspector scans the road 502, and then selects the current condition 504. The system checks to see if this is a new condition 506, if yes, the system switches to generate the new condition signal 508. The system then generates the appropriate tone and the recorder 14 records the condition signal 510. The system checks to see if the session has ended 512 and if it has not, returns to repeat the process continuously. In this manner, the system records the gps position and the condition while the driver inspects the roadway to update the condition signal and gps position as they change. When the session is ended, the system reviews the recorded data 514 and generates a location map 516 based on the gps locations but unlike the prior art, adds a varying condition indicator 518 such as a color to the output to indicate the road condition on the output of the final output map 520. Thus, where the prior art only provided a simple line map with video file locations and required one to view the video to see the current condition, the present invention allows one to see the road condition on the condition map 401 itself. This is done my moving the files from the recording device to a computer and running them through a mapping software such as GOOGLE EARTH™ software available from Google Inc., 1600 Amphitheatre Parkway, Mountain View, CA 94043 to get the locations. One the locations are mapped, the file is saved and moved to AUTOCAD where the condition colors and symbols associated with the conditions for each location are used to change the properties associated with that section of the map such as the color of that location or to add a signal at that location. On each location on the map, the system applies unique condition indicators on the output to show the varying road conditions 514 that were recorded for that location. The preferable method is to use color, symbols, or text to indicate the road condition so that large swaths of land such as an entire township or county can be viewed on one letterhead sized piece of paper and to indicate potholes or the like with a unique symbol such as a hashtag. The system then uses the software outputs to download the data and/or output the map 516 preferably using a color printer. Note that the computer aided design information can also be output as a spreadsheet if that output is preferred. For the preferred embodiment of the dataset columns used are GPS location, road name, condition, #potholes, #cracks, Audio notes, drain, and a link to work history. The spreadsheet allows the information to be sorted so that priorities can be determined and decisions made as to which repairs need to be done in what order. As indicated by this approach, once placed in a spreadsheet format, a simple cross reference formula can be applied from the GPS location to known streets to apply street names or addresses to the spreadsheet database. Thus, the database can include a GPS location per row with columns for location address, street name, condition, and a cross reference link to the video image to be shown for that location. This provides a database and a map that can be used in addition to the known prior art video playback system. The database or map can be output onto a screen or a physically printed map as shown in FIGS. 4 and 5. Thus, all of these information processing capabilities can be provided.

Reference numerals used throughout the detailed description and the drawings correspond to the following elements:
Vehicle 10
Asset inspector 12
GPS video/audio recorder 14
Asset management mapping system 100
Microphone 102
Condition signal generator 200
audio condition signal 201
Keypad 210
Condition selectors 220
Good condition 230
Good condition signal 231
Fair condition 232
Fair condition signal 233
Critical condition 234
Critical condition signal 235
Lost condition 236
Lost condition signal 237
Excellent condition 238
Excellent condition signal 239
Surface condition 240
Surface condition signal 241
Cracked Surface Condition 242
Cracked Surface Condition signal 243
Starting pothole condition 250
Starting pothole condition signal 251
Critical pothole condition 252
Critical pothole condition signal 253
Audio note condition 260
Audio note condition signal 261
Large volume cracking condition 270
Large volume cracking condition signal 271
Alligator surface condition 272
Alligator surface condition signal 273
Condition tone decoder 300
Condition output device 400
Condition map 401
Condition indicator 402
Good condition pattern 430
Fair condition pattern 432
Critical condition pattern 434
Lost condition pattern 436
Excellent condition pattern 438
Surface condition pattern 440
Cracked Surface Condition pattern 442
Starting pothole condition pattern 450
Critical pothole condition pattern 452
Audio note condition pattern 260
Large volume cracking condition pattern 470
Alligator surface condition pattern 472

From the foregoing, it will be seen that this invention is well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A mobile reviewed condition signal system comprising:
condition selectors including mobile reviewed condition selectors;
a signal generator generating a unique condition signal for each condition selector;
a condition tone decoder generating a unique output for each condition signal;
a printer generating a unique output for each condition signal; and
the mobile reviewed condition selectors selected from the condition group including a good condition selector and a needs attention condition selector.

2. A mobile reviewed condition signal system comprising:
condition selectors including mobile reviewed condition selectors;
a signal generator generating a unique condition signal for each condition selector;
a condition tone decoder generating a unique output for each condition signal;

a printer generating a unique output for each condition signal; and the unique tone for each condition selector chosen from a signal group including a good condition signal and a needs attention condition signal.

3. A mobile reviewed condition signal system comprising:

condition selectors including mobile reviewed condition selectors;

a signal generator generating a unique condition signal for each condition selector;

a condition tone decoder generating a unique output for each condition signal:

a printer generating a unique output for each condition signal; and a condition tone decoder generating a unique output for each condition signal; and the unique output for each condition signal chosen from a pattern group including a good condition pattern a needs attention condition pattern.

* * * * *